United States Patent [19]

Narayan et al.

[11] Patent Number: 5,382,646

[45] Date of Patent: Jan. 17, 1995

[54] POLY(URETHANE-UREA) MICROCELLULAR ELASTOMER COMPOSITIONS

[75] Inventors: Thirumurti Narayan, Grosse Ile; Samuel E. Johnson, Southgate; Michael A. Dimitroff, Riverview; Dietrich Schlotterbeck, Trenton, all of Mich.

[73] Assignee: BASF Corporation

[21] Appl. No.: 284,722

[22] Filed: Aug. 2, 1994

Related U.S. Application Data

[63] Continuation of Ser. No. 100,636, Jul. 30, 1993, abandoned, which is a continuation of Ser. No. 13,133, Feb. 3, 1993, abandoned, which is a continuation of Ser. No. 843,328, Feb. 28, 1992, abandoned.

[51] Int. Cl.⁶ .................... C08G 18/10; C08G 18/30; C08G 18/32
[52] U.S. Cl. ........................................ 528/60; 528/61; 528/64; 528/66
[58] Field of Search ................... 528/60, 61, 64, 66

[56] References Cited

U.S. PATENT DOCUMENTS

| | | | |
|---|---|---|---|
| 4,487,912 | 12/1984 | Zimmerman et al. | 528/52 |
| 4,581,386 | 4/1986 | Taylor et al. | 521/125 |
| 4,636,531 | 1/1987 | Schmidt et al. | 528/64 |
| 4,738,993 | 4/1988 | Markovs | 528/64 |
| 4,837,245 | 6/1989 | Streu | 528/66 |

FOREIGN PATENT DOCUMENTS

| | | |
|---|---|---|
| 0022617A | 1/1981 | European Pat. Off. |
| 2107336A | 4/1983 | United Kingdom |
| 2163762A | 3/1986 | United Kingdom |

*Primary Examiner*—Morton Foelak
*Attorney, Agent, or Firm*—Mary E. Golota

[57] ABSTRACT

Poly(urethane-urea) reaction injection molded compositions having improved processing and lower water absorption are prepared by reacting an isocyanate-terminated prepolymer prepared by reacting 4,4'-MDI or modified 4,4'-MDI and a polyoxypropylene glycol having a molecular weight of from 400 to 2500 with a polyether polyol and a hindered amine or glycol chain extender, in the presence of a urethane-reaction promoting catalyst, optionally including a hydroxyl terminated chain extender and internal mold release agent.

16 Claims, No Drawings

POLY(URETHANE-UREA) MICROCELLULAR ELASTOMER COMPOSITIONS

This is a continuation, of application Ser. No. 08/100,636 filed Jul. 30, 1993, now abandoned which is a continuation of application Ser. No. 08/013,133 filed on Feb. 3, 1993, now abandoned, which is a continuation of application Ser. No. 07/843,328 filed Feb. 28, 1992, now abandoned.

BACKGROUND OF THE INVENTION

1. Field of the Invention

The subject invention pertains to reactive compositions useful for preparation of microcellular poly(urethane-urea) parts by reaction injection molding (RIM). More particularly, the subject invention pertains to a RIM system wherein a major portion of the polyisocyanate component is an isocyanate terminated prepolymer prepared by the reaction of a polyoxypropylene glycol with a methylenebis(phenylisocyanate).

2. Description of the Related Art

Reaction injection molding (RIM) and its closely related variations reinforced RIM (RRIM) and structural RIM (SRIM) are by now widely used to prepare complex parts, particularly in the transportation industries. A common use of this technology is to produce fascias for automobiles, for example.

The varieties of RIM, which for purposes of this application includes within the term "RIM" RRIM and SRIM, are made practical by the use of reactive resin systems which have high flow rates but short cure rates, or gel times. These two requirements are necessary, the former to enable complete filing of an often large and complex mold; the latter to enable a high rate of productivity from the mold. In order to achieve these somewhat conflicting goals, resin systems have been developed which rely on the use of complex mixtures of components.

In U.S. Pat. No. 4,218,543, herein incorporated by reference, is disclosed the use of sterically hindered aromatic diamines such as 1-methyl-3,5-diethyl-2,4-diaminobenzene, 1-methyl-3,5-diethyl-2,6-diaminobenzene, and other diamines in which the reactivity of the diamine is lessened by the presence of alkyl groups ortho the amino group, these diamines hereinafter referred to as "hindered aromatic diamines". The isocyanates useful were said to be 4,4'-methylenebis(phenylisocyanate) (4,4'-MDI) or low molecular weight adducts prepared by joining two molecules of 4,4'-MDI by means of a urethane or carbodiimide linkage. The RIM systems of the '543 patent exhibit low gel times, on the order of 3 seconds or so, but have less than ideal flowability.

U.S. Pat. No. 4,374,210 discloses an improvement in poly(urethane-urea) RIM systems by use of an isocyanate terminated prepolymer derived from reacting 4,4'-MDI with a polyoxyethylenepolyoxypropylene copolymer diol or triol, a polyoxytetramethylene glycol, or a polyester diol or triol. Such prepolymers are said to increase utilization of the RIM machinery due to the ability to operate at nearly a 1:1 ratio of the A and B sides. However, the systems of U.S. Pat. No. 4,374,210 lack optimal flow and RIM parts prepared according to this method suffer from increased water absorption.

OBJECTS OF THE INVENTION

It would be desirable to formulate a RIM system having superior flowability while maintaining low gel times but short demold times. It would further be desirable to obtain RIM parts having decreased water absorption.

SUMMARY OF THE INVENTION

These and other objects have been achieved through the formulation of a RIM system which contains, as necessary components, a chain extender which is a hindered aromatic diamine or low molecular weight glycol such as ethylene glycol, a polyether polyol, a urethane group promoting catalyst, and an isocyanate terminated prepolymer prepared by reacting 4,4'-MDI or modified 4,4'-MDI with a polyoxypropylene glycol having a molecular weight of from 400 to about 2500. The formulations of the subject invention surprisingly have better flowability than the systems of U.S. Pat. Nos. 4,218,543 and 4,374,210 while exhibiting less water absorption.

DESCRIPTION OF THE PREFERRED EMBODIMENTS

The RIM system of the subject invention comprises the necessary components identified above. The hindered aromatic diamines have been previously described and need no further discussion. The polyether polyol components are well known to those skilled in the art, and form a component of the so-called "B" side of the polyurethane-urea RIM system. Suitable polyols are polyoxyethylene, polyoxypropylene, and polyoxyethylene polyoxypropylene polyethers having functionalities of from 2 to 4 and molecular weights of from about 1500 to about 15,000. Particularly suitable are the polyoxypropylated diols and triols such as those initiated with ethylene glycol, propylene glycol, diethylene glycol, dipropylene glycol, bisphenol A, hydroquinone, trimethylolpropane, and glycerine. Preferably, the functionality is from 2-3 and the molecular weight from about 3,000 to 10,000.

Also suitable and preferred are polymer modified polyols. Such polyols comprise a dispersion of a solid polymer in a conventional polyether polyol such as those just described. The polymer phase may be prepared by numerous methods, for example by the reaction of a di- or polyisocyanate with itself to form polyisocyanurate dispersions, with low molecular weight glycols to form polyurethane dispersions, with amines to form poiyurea dispersions, with hydrazinc to form polyhydrazocarbonamide dispersions, and with alkanol amine to form dispersions having mixed character as disclosed in G.B. patent 2,163,762. Most preferred are the so-called graft polyether polyols prepared by the in-situ polymerization of vinyl monomers such as acrylonitrile and styrene in a polyether polyol as taught, for example, in reissue U.S. Pat. No. RE 33,291.

Preferred urethane group promoting catalysts are the catalysts well known in the art such as the various tin catalysts, for example dibutyltindilaurate and dibutyltindiacetate; and the various amine catalysts, such as diazatricyclo[2.2.2]octane, available commercially from Air Products and Chemicals as DABCO® 33LV. Other catalysts may also be utilized.

The isocyanate terminated prepolymers of the subject invention are prepared by reacting a 4,4'-MDI or modified 4,4'-MDI with a polyoxypropylene glycol having a molecular weight of from 400 to 2500, preferably 600 to about 1500, and most preferably from 700 to 1000. By "modified 4,4'-MDI" is meant the modifications of 4,4'-MDI wherein 4,4'-MDI, sometimes with minor quantities of 2,4'-MDI and 2,2'-MDI are reacted in such a way as to form an isocyanate mixture containing some diisocyanate molecules which are linked together by carbodiimide, urethane, urea, biuret, uretdione, or other structures to form a low molecular weight diisocyanate which is roughly a dimer of the diisocyanate reactant. Such modified MDI's are available commercially for example as LUPRANATE MM-103, a carbodiimide modified MDI, and LUPRANATE MM-102, a urethane modified MDI, both from BASF Corporation.

The subject prepolymers are prepared in conventional fashion, by reaction of the polyoxypropylene glycol with MDI or modified MDI, preferably in the presence of a urethane-promoting catalyst, at temperatures of from 50° C. to 150° C., preferably 60° C. to 80° C. The free —NCO content ranges from 10 to about 20 percent by weight.

Preferably, the formulation of the subject invention contains an internal release agent. Suitable internal release agents are disclosed, for example, in U.S. Pat. Nos. 4,636,531; 4,581,387; 4,876,019; 4,076,695; 4,585,803; 4,519,965; 4,581,386; 3,925,527; 3,993,606; 4,024,090; 4,033,912; 4,058,492; 4,098,731; 4,201,847; 4,753,966; 4,766,172 and 3,726,952, which are herein incorporated by reference.

Optionally employed may be hydroxyl-terminated chain extenders, dyes, pigments, fillers, fibrous reinforcement, and other additives conventionally employed in RIM formulations. Hydroxyl-terminated chain extenders are, for example, ethylene glycol, propylene glycol, 1,4-butanediol, 1,6-hexanediol, diethylene glycol, and the like.

The subject invention will now be illustrated by the following examples. These examples should not be construed as limiting the subject invention in any way.

EXAMPLE 1

In a reaction vessel equipped with a means to measure the temperature, an addition funnel, stirrer, and inlet for nitrogen, was charged 5816 parts of a composition of 98 weight percent 4,4'-MDI and 2 weight percent maximum of 2,4'-MDI, and 0.3 parts benzoyl chloride. The temperature of the reactor was raised to 60° C. following which 184 parts of a polyoxypropylene glycol having a nominal molecular weight of 700 was added uniformly over a period of 90 minutes. Following addition, the reactor temperature was raised to 80° C. for 45 minutes. The entire reaction took place under nitrogen. The prepolymer obtained had an —NCO content of 14.8 weight percent and a viscosity of 2650 cps at 25° C.

EXAMPLE 2

A RIM formulation was prepared as follows. The A side consisted of the prepolymer of Example 1. The B side consisted of polyol A, a glycerine initiated polyol having a nominal functionality of about 2.5, a nominal hydroxyl number of 27.5, and containing 78 weight percent oxypropylene moieties and 21 weight percent oxyethylene moieties, 33.07 parts; polyol B, a 30 weight percent 1:1 acrylonitrile/styrene graft polyether polyol prepared by the in situ polymerization of styrene and acrylonitrile in a trimethylolpropane initiated polyol having a nominal functionality of 2.6, a nominal hydroxyl number of 35, and containing 84 weight percent oxypropylene and 13 weight percent oxyethylene moieties, 33.07 parts; diethyltoluenediamine, 27.81 parts; dibutyltindilaurate catalyst, 0.25 part; DABCO® 33LV amine catalyst 1.00 part; L5304 Surfactant, 0.80 part; and 4.00 parts of an internal mold release containing the oleic acid salt of 1-hydroxy-2-ethylpiperazine, zinc stearate, calcium stearate, and sodium stearate.

EXAMPLE 3

A RIM part was produced on a Cincinnati Milacron RIMM90 machine using a high pressure mixhead using a 36"×36"×0.125" steel mold. The RIM plaque was demolded after approximately one minute. After demolding, the part was post cured in an oven at 250° F. for one hour. Parts were then tested, yielding the following properties. This system possessed better flowability than comparable systems not utilizing the prepolymer of the subject invention in tests conducted with automobile bumer molds.

| Property | Test Procedure | Results |
| --- | --- | --- |
| Density, pcf | ASTM D792 | 64.7 |
| Tensile Strength, psi | ASTM D412 | 4457.0 |
| Tear Strength (Die C), pli | ASTM D624 | 644.0 |
| Hardness, Shore D | ASTM D2240 | 62.0 |
| Elongation, % | ASTM D412 | 203.0 |
| Flexural Modulus (72 F.), psi | ASTM D747 | 49,980.0 |
| Flexural Modulus (−20 F.), psi | ASTM D747 | 79,722.0 |
| Flexural Modulus (158 F.), psi | ASTM D747 | 26,714.0 |
| Heat Sag (4" o.h. FOR 1 hr. at 250° F., in. | | 0.27 |
| Notched Izod Impact, ft-lb/in ASTM D256 | | 9.0 |

EXAMPLE 4

An ethylene glycol chain extended RIM system is illustrated in this example. The A side consisted of 84 parts of prepolymer of Example 1. The B side consisted of polyol C, a glycerine initiated polyol having a nominal functionality of about 3, a nominal hydroxyl number of 35, and containing about 80 weight percent oxypropylene moieties and 20 weight percent oxyethylene moieties, 92.5 parts; ethylene glycol, 7 parts; Dabco X8154 catalyst, 0.4 parts; and Dabco T-131 catalyst 0.04 parts.

EXAMPLE 5

A RIM part was produced employing the following process parameters.

Resin Temperature=75°–80° F.
Iso Temperature=80°–85° F.
Mold Temperature=140°–160° F.
Mix Ratio (pbw)=84.0 Iso/100.0 Resin
Mix Pressures=2000–2200 psi Iso/2000–2200 psi Resin
Maximum Shot Time=22 seconds
Inmold Cure Time=3–5 minutes The parts thus produced were tested, yielding the following properties.

| | |
| --- | --- |
| Density | 63.3 |
| Tensile Strength, psi | 1147 |
| Ultimate Elongation, % | 236 |
| Die 'C' Tear Strength, pi | 217 |
| Split Tear Strength, pi | 45 |
| Hardness, Shore A | 67 |
| Flexural Modulus (at 77° F.), psi | 1360 |

| Water Absorption (24 hrs.), % | 3.3 |
| --- | --- |

We claim:

1. A composition suitable for the preparation of reaction injection molded poly(urethane-urea) parts, comprising:
   a) an isocyanate component consisting of an isocyanate terminated prepolymer prepared by reacting an isocyanate selected from the group consisting of 4,4'-methylenebis(phenylisocyanate), modified 4,4'-methylenebis(phenylisocyanate) or mixtures thereof, with a polyoxypropylene glycol having a molecular weight of from 400 to about 2500, the prepolymer having an isocyanate group content of from about 10 to less than 20 weight percent;
   b) a polyether polyol component;
   c) a urethane reaction-promoting catalyst which is not a polyester polyol containing tin and/or titanium compounds; and
   d) a hindered diamine chain extender.

2. The composition of claim 1 further comprising
   e) an internal mold release composition.

3. The composition of claim 1 further comprising
   f) a low molecular weight hydroxyl terminated chain extender.

4. The composition of claim 3 further comprising
   e) an internal mold release composition.

5. The composition of claim 1 wherein said polyether polyol component b) further comprises a polymer modified polyether polyol.

6. The composition of claim 2 wherein said polyether polyol component b) further comprises a polymer modified polyether polyol.

7. The composition of claim 3 wherein said polyether polyol component b) further comprises a polymer modified polyether polyol.

8. The composition of claim 4 wherein said polyether polyol component b) further comprises a polymer modified polyether polyol.

9. The composition of claim 1 wherein said polyoxypropylene glycol has a molecular weight of from 600 to about 1500.

10. The composition of claim 2 wherein said polyoxypropylene glycol has a molecular weight of from 600 to about 1500.

11. The composition of claim 3 wherein said polyoxypropylene glycol has a molecular weight of from 600 to about 1500.

12. The composition of claim 4 wherein said polyoxypropylene glycol has a molecular weight of from 600 to about 1500.

13. The composition of claim 5 wherein said polyoxypropylene glycol has a molecular weight of from 600 to about 1500.

14. The composition of claim 6 wherein said polyoxypropylene glycol has a molecular weight of from 600 to about 1500.

15. The composition of claim 7 wherein said polyoxypropylene glycol has a molecular weight of from 600 to about 1500.

16. The composition of claim 8 wherein said polyoxypropylene glycol has a molecular weight of from 600 to about 1500.

* * * * *